United States Patent [19]

Takahashi et al.

[11] 4,394,581
[45] Jul. 19, 1983

[54] RADIATION IMAGE STORAGE PANEL

[75] Inventors: Kenji Takahashi; Hisashi Yamazaki; Junji Miyahara, all of Minamiashigara; Noboru Kotera; Shusaku Eguchi, both of Odawara; Norio Miura, Isehara, all of Japan

[73] Assignee: Fuji Photo Film Co., Ltd., Kanagawa, Japan

[21] Appl. No.: 156,520

[22] Filed: Jun. 5, 1980

[30] Foreign Application Priority Data

Jun. 7, 1979 [JP] Japan .................................. 54/71604

[51] Int. Cl.$^3$ ............................................ H05B 33/00
[52] U.S. Cl. .............................. 250/484.1; 250/486.1; 250/327.2
[58] Field of Search ............ 250/484, 482, 483, 327.1, 250/337, 487, 486

[56] References Cited

U.S. PATENT DOCUMENTS 3,975,637  8/1976  Ikedo et al. ...................... 250/327.1
4,012,637  3/1977  Swank ................................. 250/483

Primary Examiner—Alfred E. Smith
Assistant Examiner—Carolyn E. Fields
Attorney, Agent, or Firm—Gerald J. Ferguson, Jr.; Joseph J. Baker

[57] ABSTRACT

A radiation image storage panel having a fluorescent layer which comprises a binder and a stimulable phosphor dispersed therein. Further, the panel is colored with a colorant so that the mean reflectance of the panel in the wavelength region of the stimulating rays of the stimulable phosphor is lower than the mean reflectance of the panel in the wavelength region of the light emitted by the stimulable phosphor upon stimulation thereof. The panel provides an image of high sharpness.

13 Claims, 11 Drawing Figures

F I G. 3
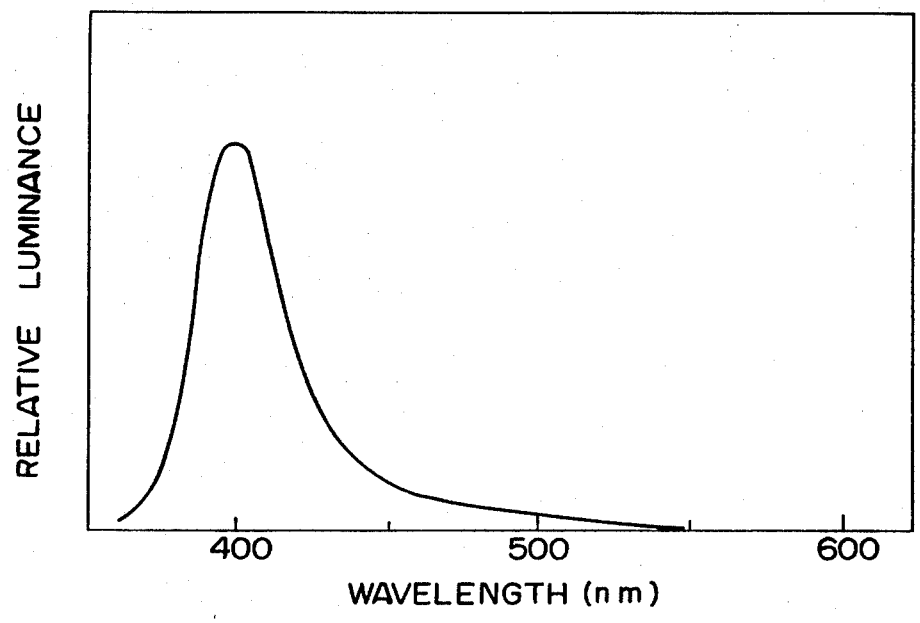

RADIATION IMAGE STORAGE PANEL

BACKGROUND OF THE INVENTION

1. Field of the Invention

This invention relates to a radiation image storage panel using a stimulable phosphor, and more particularly to a radiation image storage panel for recording and reproducing a radiation image using a stimulable phosphor which stores radiation energy and emits light upon stimulation thereof.

2. Description of the Prior Art

As is well known in the art, a photographic method using a silver salt such as radiography in which an X-ray film having an emulsion layer comprising a silver salt is used in combination with an intensifying screen has generally been employed to obtain a radiation image. Recently, from the viewpoint of problems such as shortage of silver resources, a method of obtaining a radiation image without using a silver salt has been desired.

An example of such a method is disclosed in U.S. Pat. No. 3,859,527. In the method of the patent, is used a radiation image storage panel comprising a stimulable phosphor which emits light when stimulated by an electromagnetic wave selected from visible light and infrared rays after exposure to a radiation (The term "radiation" as used herein means an electromagnetic wave or a corpuscular radiation such as X-rays, α-rays, β-rays, γ-rays, high-energy neutron rays, cathode rays, vacuum ultraviolet rays, ultraviolet rays, or the like.). The method comprises the steps of (i) causing the stimulable phosphor of the panel to absorb a radiation passing through an object, (ii) scanning the panel with an electromagnetic wave such as visible light or infrared rays (hereinafter referred to as "stimulating rays") to sequentially release the radiation energy stored in the panel as light emission, and (iii) electrically converting the emitted light to an image.

By the way, it is well known in the art that in the conventional radiography in which an intensifying screen is used in combination with an X-ray film, the sharpness of the image obtained depends upon the degree of spread of the spontaneous light emitted by the phosphor in the intensifying screen. In contrast to this, in the above-mentioned method for recording and reproducing a radiation image utilizing the stimulability of a stimulable phosphor, the sharpness of the image obtained does not depend upon the degree of spread of the light emitted by the stimulable phosphor in the panel, but depends upon the degree of spread of the stimulating rays in the panel. The reason for this will be explained as follows. That is, in the above-mentioned method for recording and reproducing a radiation image, the radiation image stored in the panel is taken out of the panel sequentially as mentioned above. Therefore, all of the light emission caused by the stimulating rays at a certain period ($t_i$) is desirably detected as the output of a certain picture element ($x_i$, $y_i$) on the panel which is exposed to the stimulating rays during the period ($t_i$). Where the stimulating rays spread in the panel due to scattering or the like and stimulates the phosphor surrounding the picture element ($x_i$, $y_i$) in addition to the picture element ($x_i$, $y_i$), the output for the area broader than the picture element ($x_i$, $y_i$) is detected as the output of the picture element ($x_i$, $y_i$). Accordingly, if the light emission caused by the stimulating rays during the period ($t_i$) is only the one emitted by the picture element ($x_i$, $y_i$) solely which has been exactly exposed to the stimulating rays during the periods ($t_i$), the emitted light does not affect the sharpness of the image obtained no matter how the emitted light spreads in the panel.

The radiation image storage panel employed in the above-mentioned method for recording and reproducing a radiation image has at least a fluorescent layer comprising a proper binder and a stimulable phosphor dispersed therein. Although the fluorescent layer itself can be a radiation image storage panel when the fluorescent layer is self-supporting, the fluorescent layer is generally provided on a proper substrate to form a radiation image storage panel. Further, a protective layer for physically and chemically protecting the fluorescent layer is usually provided on the exposed surface of the fluorescent layer. Furthermore, a primer layer is sometimes provided between the fluorescent layer and the substrate to closely bond the fluorescent layer to the substrate. In the conventional radiation image storage panel having such a structure, the stimulating rays broadly spread in the panel due to irradiation in the fluorescent layer, halation in the protective layer, the primer layer or the substrate, or the like. Therefore, an image of high sharpness cannot be obtained by the conventional radiation image storage panel.

SUMMARY OF THE INVENTION

In view of the above-mentioned defects in the conventional radiation image storage panel, an object of the present invention is to provide a radiation image storage panel which provides a sharp image.

In order to accomplish the above-mentioned object, the inventors investigated to improve the sharpness of the conventional radiation image storage panel. As a result of the investigations, it has been found that by coloring the radiation image storage panel with a colorant which selectively absorbs the stimulating rays, the spread of the stimulating rays in the panel can be controlled by the absorption of the stimulating rays by the colorant and an image having markedly improved sharpness can be obtained.

The radiation image storage panel of the present invention has a fluorescent layer comprising a binder and a stimulable phosphor dispersed therein characterized in that the radiation image storage panel is colored with a colorant so that the mean reflectance of the panel in the wavelength region of the stimulating rays of the stimulable phosphor is lower than the mean reflectance of the panel in the wavelength region of the light emitted by the stimulable phosphor upon stimulation thereof.

BRIEF DESCRIPTION OF THE DRAWINGS

FIG. 3 is a graph showing the spectrum of the light emitted by the BaFBr:$Eu^{2+}$ phosphor upon stimulation thereof, and FIGS. 4–11 are schematic diagrams of various illustrative embodiments of radiation image storage panels in accordance with the invention.

DETAILED DESCRIPTION OF THE INVENTION

Figure 1:
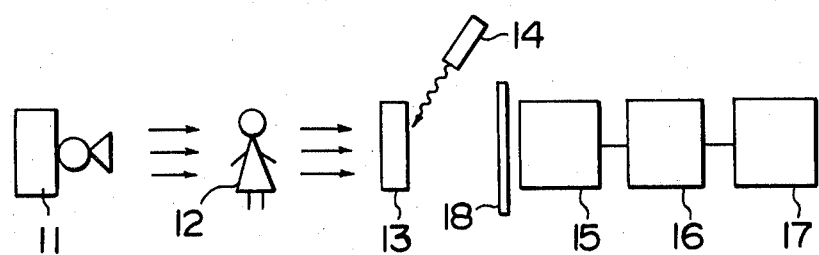
FIG. 1 schematically shows the method for recording and reproducing a radiation image using the radiation image storage panel of the present invention.

The present invention will be described in detail hereinbelow.

It is required for the colorant employed in the radiation image storage panel of the present invention to have a low reflectance to the wavelength of the stimulating rays and to absorb the stimulating rays when the radiation image storage panel is exposed thereto. Because of the absorption of the stimulating rays by the colorant, the spread of the stimulating rays in the panel due to irradiation in the fluorescent layer, halation in the protective layer, the primer layer or the substrate, or the like is controlled. As a result, the sharpness of the image obtained is improved. On the other hand, from viewpoint of the sensitivity of the radiation image storage panel, it is required for the colorant employed in the radiation image storage panel of the present invention to have as high reflectance as possible to the wavelength of the light emitted by the stimulable phosphor upon the stimulation thereof. That is, it is required for the colorant to have as low absorbance as possible to the above wavelength and not to lower the sensitivity of the panel. Accordingly, from the viewpoint of both the sharpness and the sensitivity of the radiation image storage panel, a colorant the reflectance of which to the wavelength of the stimulating rays is lower than the reflectance thereof to the wavelength of the light emitted by the stimulable phosphor upon stimulation thereof is employed in the radiation image storage panel of the present invention. More concretely, the colorant employed in the radiation image storage panel of the present invention has reflection characteristics that the mean reflectance thereof in the wavelength region of the stimulating rays of the stimulable phosphor employed in the panel is lower than the mean reflectance thereof in the wavelength region of the light emitted by the stimulable phosphor upon stimulation thereof. Accordingly, the radiation image storage panel of the present invention colored with such a colorant has reflection characteristics that the mean reflectance of the panel in the wavelength region of the stimulating rays of the stimulable phosphor employed in the panel is lower than the mean reflectance of the panel in the wavelength region of the light emitted by the stimulable phosphor upon stimulation thereof. From a viewpoint of improvement of the sharpness, the mean reflectance of the radiation image storage panel of the present invention in the wavelength region of the stimulating rays of the stimulable phosphor employed in the panel is desired to be as low as possible. Generally, the mean reflectance is preferably not higher than 95% of the mean reflectance of the uncolored equivalent in the same wavelength region. When the mean reflectance is higher than 95%, the sharpness of the panel is not sufficiently improved. On the other hand, from a viewpoint of sensitivity, the mean reflectance of the radiation image storage panel of the present invention in the wavelength region of the light emitted by the stimulable phosphor employed in the panel upon the stimulation thereof is desired to be as high as possible. Generally, the mean reflectance is preferably not lower than 30%, more preferably not lower than 90% of the mean reflectance of the uncolored equivalent in the same wavelength region. The term "reflectance" as used herein means the reflectance measured by use of an integrating-sphere photometer.

It has been well known in the art that in radiography, an intensifying screen in colored with a colorant to improve the sharpness of the image obtained, and the intensifying screen colored with a colorant has already been used practically. However, the improvement of the sharpness by use of a colorant in an intensifying screen is accomplished by causing the colorant to absorb the light (spontaneous light) emitted by the phosphor constituting the intensifying screen. This improvement is theoretically quite different from the improvement of the sharpness by use of a colorant in the radiation image storage panel of the present invention which is accomplished by causing the colorant to absorb the stimulating rays of the stimulable phosphor constituting the panel. Further, since the improvement of the sharpness by use of a colorant in an intensifying screen is accomplished by causing the colorant to absorb the spontaneous light emitted by the phosphor constituting the intensifying screen, that is, by sacrificing the sensitivity of the intensifying screen, there is a limit for the degree of the coloration of the intensifying screen with the colorant, and the intensifying screen cannot be colored to a great degree with the colorant. In contrast to this, since the improvement of the sharpness by use of a colorant in the radiation image storage panel of the present invention is accomplished by causing the colorant to absorb the stimulating rays, by using a colorant which selectively absorbs the stimulating rays (a colorant which does not absorb or hardly absorbs the light emitted by the stimulable phosphor upon the stimulation thereof) the radiation image storage panel of the present invention can be colored to a great degree without markedly lowering the sensitivity of the panel, whereby the sharpness of the image obtained by the panel can be markedly improved. As a matter of course, the higher becomes the degree of the coloration of the panel, the lower becomes the stimulation efficiency of the panel. However, the stimulation efficiency of the panel can easily be prevented from lowering by increasing the intensity of the stimulating rays. As described above, in the radiation image storage panel of the present invention, the sharpness can be improved without sacrificing the sensitivity of the panel unlike an intensifying screen.

In the radiation image storage panel of the present invention, any of the elements constituting the panel may be colored with a colorant. That is, it is possible to color the fluorescent layer, the substrate, the protective layer and/or the primer layer. Further, the panel may be colored by dividing the fluorescent layer into two layers and providing between the two layers an intermediate layer colored with a colorant (The intermediate layer does not contain a stimulable phosphor.). The radiation image storage panel of the present invention has, for example, the following constructions as described below and illustrated in FIGS. 4–11.

1. Radiation image storage panel consisting solely of a fluorescent layer which is self-supporting and is colored with a colorant.
2. Radiation image storage panel comprising a first protective layer, a self-supporting fluorescent layer disposed thereon and a second protective layer disposed further thereon in which at least one of the layers is colored with a colorant (FIG. 4).
3. Radiation image storage panel comprising a substrate and a fluorescent layer provided thereon in which the substrate and/or the fluorescent layer is colored with a colorant (FIG. 5).

4. Radiation image storage panel comprising a substrate, a primer layer disposed thereon and a fluorescent layer disposed further thereon in which at least one of the elements is colored with a colorant (FIG. 6).

5. Radiation image storage panel comprising a substrate, a fluorescent layer disposed thereon and a protective layer disposed further thereon, in which at least one of the elements is colored with a colorant (FIG. 7).

6. Radiation image storage panel comprising a substrate, a primer layer disposed thereon, a fluorescent layer disposed further thereon and a protective layer disposed further thereon in which at least one of the elements is colored with a colorant (FIG. 8).

7. Radiation image storage panel comprising a substrate, a first fluorescent layer disposed thereon, an intermediate layer disposed further thereon and a second fluorescent layer disposed further thereon in which at least the intermediate layer is colored with a colorant (FIG. 9).

8. Radiation image storage panel comprising a substrate, a first fluorescent layer disposed thereon, an intermediate layer disposed further thereon, a second fluorescent layer disposed further thereon and a protective layer disposed further thereon in which at least the intermediate layer is colored with a colorant (FIG. 10).

9. Radiation image storage panel comprising a substrate, a primer layer disposed thereon, a first fluorescent layer disposed further thereon, an intermediate layer disposed further thereon, a second fluorescent layer disposed further thereon and a protective layer disposed further thereon in which at least the intermediate layer is colored with a colorant (FIG. 11).

In the radiation image storage panel of the present invention, the resulting effect of the coloration depends upon which element or elements are colored. Generally, in order to prevent the occurrence of irradiation in the fluorescent layer, it is particularly effective to color the fluorescent layer or to provide the colored intermediate layer in the fluorescent layer. When the fluorescent layer is colored or the colored intermediate layer is provided in the fluorescent layer, the sharpness of the image obtained is improved particularly in the relatively high spatial frequency region. On the other hand, in order to prevent the occurrence of halation in the protective layer, the primer layer or the substrate, it is particularly effective to color the protective layer, the primer layer or the substrate. When the protective layer, the primer layer or the substrate is colored, the sharpness of the image obtained is improved particularly in the relatively low spatial frequency region. The resulting effect of the coloration depends upon which element or elements are colored as described above. For instance, in case of the radiation image storage panels in which only one element thereof is colored, the rank of the effect of the coloration of the panel generally becomes as follows depending upon which element is colored;

fluorescent layer > intermediate layer > primer layer or substrate > protective layer.

When the protective layer remote from the protective layer upon which the stimulating rays impinge is colored in the above-mentioned radiation image storage panel which comprises a first protective layer, a fluorescent layer disposed thereon and a second protective layer disposed further thereon, the effect of the coloration of the panel correspond to that of the panel having a colored substrate.

As described hereinabove, the colorant employed in the radiation image storage panel of the present invention has reflection characteristics that the mean reflectance thereof in the wavelength region of the stimulating rays of the stimulable phosphor employed in the panel is lower than the mean reflectance thereof in the wavelength region of the light emitted by the stimulable phosphor upon stimulation thereof. Therefore, the colorant employed in the panel depends upon the kind of the stimulable phosphor employed therein. As described hereinbelow, from the viewpoint of practical use, the stimulable phosphor employed in the radiation image storage panel of the present invention should preferably be a phosphor which emits light having a wavelength ranging from 300 to 600 nm when exposed to stimulating rays having a wavelength ranging from 500 to 800 nm. In combination with such a stimulable phosphor, a colorant having a body color ranging from blue to green is employed so that the mean reflectance of the panel in the wavelength region of the stimulating rays of the stimulable phosphor may be lowered down to below the mean reflectance of the panel in the wavelength region of the light emitted by the stimulable phosphor upon stimulation thereof, and that the difference therebetween may be enlarged. As the colorant, either an organic colorant or an inorganic colorant can be employed. For example, the organic colorant having a body color ranging from blue to green which can be employed in the radiation image storage panel of the present invention includes Zapon Fast Blue 3G (manufactured by Höechst AG.), Estrol Brill Blue N-3RL (manufactured by Sumitomo Kagaku Co., Ltd.), Sumiacryl Blue F-GSL (manufactured by Sumitomo Kagaku Co., Ltd.), D & C Blue No. 1 (manufactured by National Aniline Co., Ltd.), Spirit Blue (manufactured by Hodogaya Kagaku Co., Ltd.), Oil Blue No. 603 (manufactured by Orient Co., Ltd.), Kiton Blue A (manufactured by Ciba Geigy AG.), Aizen Cathilon Blue GLH (manufactured by Hodogaya Kagaku Co., Ltd.), Lake Blue A.F.H. (manufactured by Kyowa Sangyo Co., Ltd.), Rodalin Blue 6GX (manufactured by Kyowa Sangyo Co., Ltd.), Primocyanine 6GX (manufactured by Inahata Sangyo Co., Ltd.), Brillacid Green 6BH (manufactured by Hodogaya Kagaku Co., Ltd.), Cyanine Blue BNRS (manufactured by Toyo Ink Co., Ltd.), Lionol Blue SL (manufactured by Toyo Ink Co., Ltd.), and the like. For example, the inorganic colorant having a body color ranging from blue to green which can be employed in the radiation image storage panel of the present invention includes ultramarine blue, cobalt blue, cerulean blue, chromium oxide, pigment of $TiO_2$—$ZnO$—$CoO$—$NiO$ system, and the like.

As mentioned above, the stimulable phosphor which can be employed in the radiation image storage panel of the present invention is a phosphor which emits light when exposed to stimulating rays after exposure to a radiation. From the viewpoint of practical use, the stimulable phosphor should preferably be a phosphor which emits light having a wavelength ranging from 300 to 600 nm when exposed to stimulating rays having a wavelength ranging from 500 to 800 nm. For example, the stimulable phosphor which can be employed in the radiation image storage panel of the present invention includes (a) SrS:Ce,Sm, SrS:Eu,Sm, $La_2O_2S$:Eu,Sm, and (Zn,Cd)S:Mn,X wherein X is halogen, which are described in the above-mentioned U.S. Pat. No. 3,859,527; (b) ZnS:Cu,Pb, $BaO \cdot xAl_2O_3$:Eu wherein x is a number satisfying the condition of $0.8 \leq x \leq 10$, and $M^{II}O \cdot xSiO_2:A$ wherein $M^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, which are described in U.S. Pat. No. 4,236,078; (c) $(Ba_{1-x-y},Mg_x,Ca_y)FX:aEu^{2+}$ wherein X is Cl and/or Br, x and y are numbers satisfying the conditions of $0 < x + y \leq 0.6$ and $xy \neq 0$, and a is a number satisfying the condition of $10^{-6} \leq a \leq 5 \times 10^{-2}$, which is described in U.S. patent application Ser. No. 57,080, now abandoned; (d) LnOX:aA wherein Ln is at least one element selected from the group consisting of La, Y, Gd and Lu, X is Cl and/or Br, A is Ce and/or Tb, and x is a number satisfying the condition of $0 < x < 0.1$, which is described in U.S. Pat. No. 4,236,078; (e) $(Ba_{1-x},M^{II}_x)FX:yA$ wherein $M^{II}$ is at least one divalent metal selected from the group consisting of Mg, Ca, Sr, Zn and Cd, X is at least one halogen selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, which is described in U.S. Pat. No. 4,239,968; and the like. However, it is needless to say that the stimulable phosphor which can be employed in the present invention is not limited to the above-mentioned phosphors, and that any phosphor can be employed in the present invention provided that the phosphor emits light when exposed to stimulating rays after exposure to a radiation.

In general, there is a tendency that the smaller becomes the mean particle size of the stimulable phosphor employed in a radiation image storage panel, the higher becomes the granularity thereof but the lower becomes the sensitivity thereof. To the contrary, there is a tendency that the larger becomes the mean particle size of the stimulable phosphor employed in the radiation image storage panel, the higher becomes the sensitivity thereof but the lower becomes the granularity thereof. In consideration of these tendencies, the stimulable phosphor employed in the present invention is generally selected from those having a mean particle size ranging from 0.1 to 100μ. The stimulable phosphor having a mean particle size ranging from 1 to 30μ is preferably employed. Further, the amount of the stimulable phosphor employed is properly decided in view of the recording and reproducing performance and the economy of the radiation image storage panel. The amount of the stimulable phosphor is generally within the range of 3 to 300 mg. per 1 cm² of the radiation image storage panel.

The fluorescent layer of the radiation image storage panel of the present invention is formed by dispersing the stimulable phosphor (This is the case wherein the fluorescent layer is not colored.) or the stimulable phosphor and the colorant (This is the case wherein the fluorescent layer is colored. When the fluorescent layer is self-supporting and the radiation image storage panel consists solely thereof, the fluorescent layer should essentially be colored.) in a proper binder to prepare a coating dispersion, and then applying the coating dispersion by the conventional coating method to form an uniform layer. The coating dispersion for forming the colored fluorescent layer may be prepared either by dispersing the stimulable phosphor and the colorant separately in the binder or by causing the colorant to adhere to the surface of the stimulable phosphor beforehand, and then dispersing the resulting mixture in the binder. As the binder, for example, is used a binder which is usually used in forming a layer such as gum arabic, protein such as gelatin, polysaccharide such as dextran, polyvinyl butyral, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol, and the like. The binder is generally used in an amount of 0.01 to 1 parts by weight per one part by weight of the stimulable phosphor. However, from the viewpoint of the sensitivity and the sharpness of the panel obtained, the amount of the binder should preferably be small. Accordingly, in consideration of both the sensitivity and the sharpness of the panel and the easiness of application of the coating dispersion, the binder is preferably used in an amount of 0.03 to 0.2 parts by weight per one part by weight of the stimulable phosphor. The thickness of the fluorescent layer (In the radiation image storage panel in which the fluorescent layer is divided into two layers and a colored intermediate layer is provided therebetween, the total thickness of the three layers corresponds to this thickness.) is generally within the range of 10μ to 1 mm.

In the radiation image storage panel of the present invention, a substrate for supporting the fluorescent layer is generally used. As the substrate, various materials such as polymer material, glass, wool, cotton, paper, metal, or the like can be used. From the viewpoint of handling the panel as an information recording medium, the substrate should preferably be processed into a sheet or a roll having flexibility. In this connection, as the substrate are preferable plastic film such as cellulose acetate film, polyester film, polyethylene terephthalate film, polyamide film, polyimide film, triacetate film, polycarbonate film, and the like; ordinary paper; and processed paper such as photographic paper, printing paper such as coated paper and art paper, baryta paper, resin-coated paper, sized paper described in Belgian Pat. No. 784,615 which is sized with polysaccharide, pigment-containing paper which contains a pigment such as titanium dioxide, sized paper which is sized with polyvinyl alcohol, and the like. The substrate may have a primer layer on one surface thereof (the surface on which the fluorescent layer is provided) for the purpose of holding the fluorescent layer tightly. In providing a fluorescent layer on the substrate, a coating dispersion comprising a stimulable phosphor dispersed in a binder, or a coating dispersion comprising a stimulable phosphor and a colorant dispersed in a binder may be directly applied to the substrate to form a fluorescent layer. Alternatively, a fluorescent layer formed beforehand may be bonded to the substrate. Where the substrate used is permeable to stimulating rays, the radiation image storage panel can be exposed to stimulating rays from the substrate side.

When the substrate is colored with a colorant, it is needless to say that the substrate should be colored so that the stimulating rays arriving at the substrate are absorbed by the colorant. For example, when the material which is not permeable to stimulating rays such as metal, ordinary paper, processed paper, or the like is used as the substrate, at least the fluorescent layer side surface of the substrate should be colored. On the other hand, when the material which is permeable to stimulating rays such as glass, plastic film, or the like is used as the substrate, either surface of the substrate may be colored, or both the surfaces thereof may be colored, or the whole substrate may be colored. One surface or both the surfaces of the substrate are colored, for example, by applying thereon a coating dispersion comprising a binder and a colorant dispersed therein. The whole substrate is generally colored by dispersing a colorant in the substrate when the substrate is manufactured. Further, when the primer layer is colored with a colorant, the colorant is dispersed therein.

In the radiation image storage panel of the present invention, when an intermediate layer (not containing a stimulable phosphor) is provided between two fluorescent layes, the intermediate layer should always be colored with a colorant. When the intermediate layer is not colored with a colorant, the intermediate layer does not improve but affects the image characteristics of the panel. It seems that similarly to the case wherein a fluorescent layer is colored the disposition of the colored intermediate layer is particularly effective to prevent the occurrence of irradiation in the two fluorescent layers provided on both sides of the colored intermediate layer. The colored intermediate layer comprises a binder of the same type as that employed in a fluorescent layer, and a colorant dispersed therein. The colored intermediate layer may be provided between two fluorescent layers by applying a coating dispersion comprising a colorant dispersed in a proper binder to a first fluorescent layer formed beforehand, and then forming a second fluorescent layer on the colored intermediate layer. Alternatively, the colored intermediate layer may be provided therebetween by bonding the colored intermediate layer to a first fluorescent layer, and then, bonding a second fluorescent layer to the colored intermediate layer.

Further, in the radiation image storage panel of the present invention, a protective layer for physically and chemically protecting the surface of the fluorescent layer is generally provided on the exposed surface of the fluorescent layer (on the opposite side of the substrate). As mentioned above, when the fluorescent layer is self-supporting, the protective layer may be provided on both surfaces of the fluorescent layer. The protective layer may be provided on the fluorescent layer by directly applying thereto a coating dispersion to form the protective layer thereon, or may be provided thereon by bonding thereto the protective layer formed beforehand. As the material of the protective layer, the conventional material for a protective layer such as nitrocellulose, ethylcellulose, cellulose acetate, polyester, polyethylene terephthalate, and the like can be used.

When the protective layer is colored with a colorant, either surface thereof may be colored, or both surfaces thereof may be colored, or the whole protective layer may be colored. Generally, the whole protective layer is homogeneously colored by dispersing therein a colorant.

The radiation image storage panel of the present invention provides an image of high sharpness when used in the method for recording and reproducing a radiation image shown in FIG. 1. In the method, a radiation source 11, an object 12, a radiation image storage panel 13 of the present invention colored with a colorant, a light source 14 emitting stimulating rays which stimulate the fluorescent layer of the panel 13 to release the radiation energy stored therein as fluorescent light, a photosensor 15 for detecting the fluorescent light emitted by the panel 13, a reproduction device 16 for converting an electrical signal obtained by the photosensor 15 to an image signal corresponding to the radiation image, a display device 17 for displaying the image, and a filter 18 for cutting the stimulating rays emitted by the light source 14 and reflected by the panel 13 and for transmitting only the fluorescent light emitted by the panel 13 are arranged as shown in FIG. 1. In the method shown in FIG. 1, the photosensor 15 is used as a detector for detecting the light emitted by the panel 13, and reproduction of a radiation image is performed by means of the photosensor 15, the reproduction device 16 and the display device 17. However, means for reproducing a radiation image is not limited thereto.

As shown in FIG. 1, the object 12 is positioned between the radiation source 11 and the radiation image storage panel 13. When the object 12 is exposed to a radiation from the source 11, the radiation passes through the object 12. The intensity of the radiation which has passed through the object 12 represents the transmittance of the object 12. Therefore, an image which represents the pattern of transmittance of the object 12 is obtained by means of the radiation impinging upon the radiation image storage panel 13. The radiation in the form of the image representing the pattern of transmittance of the object 12 is absorbed by the fluorescent layer of the panel 13, and electrons or holes are generated in the fluorescent layer. The amount of the electrons or holes generated are in proportion to the amount of the radiation absorbed. The electrons or holes are stored in the trap level of the stimulable phosphor, and thus, the radiation image is stored in the panel 13.

Then, the radiation stored in the panel 13 is visualized by stimulation with the stimulating rays emitted by the light source 14. That is, the fluorescent layer of the panel 13 is scanned with the stimulating rays emitted by the light source 14, whereby the electrons or holes stored in the trap level of the stimulable phosphor are expelled therefrom, and the radiation image stored in the panel 13 is released as fluorescent light. The panel 13 is colored with a colorant which selectively absorbs the stimulating rays, and therefore, when the fluorescent layer is scanned with the stimulating rays, the spread of the stimulating rays in the panel 13 due to irradiation in the fluorescent layer, halation in the protective layer, the primer layer or the substrate, or the like is controlled by the absorption of the stimulating rays by the colorant. The luminance of the fluorescent light emitted by the panel 13 is in proportion to the number of the electrons or holes stored in the fluorescent layer of the panel 13, that is, the amount of the radiation absorbed thereby. The fluorescent light (light signal) is detected and converted to an electrical signal sequentially by the photosensor 15 such as a photomultiplier. The electrical signal obtained is converted to an image signal corresponding to the radiation image by the reproduction device 16, and a visible image is displayed by the display device 17. Thus, the radiation image is reproduced.

As mentioned above, in the radiation image storage panel of the present invention, the spread of the stimulating rays in the panel is controlled by the absorption of the stimulating rays by the colorant contained in the panel. Therefore, the sharpness of the image reproduced by the reproduction device 16 and accordingly the sharpness of the image displayed by the display device 17 is markedly improved.

The present invention will hereinbelow be described referring to several examples.

EXAMPLE 1

8 parts by weight of BaFBr:Eu$^{2+}$ phosphor (stimulable phosphor) and one part by weight of nitrocellulose (binder) were mixed by use of a solvent (a mixture of acetone, ethyl acetate and butyl acetate) to prepare a coating dispersion having a viscosity of 50 centistokes. On the other hand, a dispersion comprising a methanol and Zapon Fast Blue 3G (organic blue colorant, manufactured by Höechst AG.) dispersed therein was prepared. Then, the dispersion was added to the coating dispersion in the ratio that the amount of the colorant was 1 milligram per 100 grams of the BaFBr:Eu$^{2+}$ phosphor. Thereafter, the coating dispersion containing the colorant was uniformly applied to a polyethylene terephthalate film (substrate) positioned horizontally and dried naturally by allowing it to stand for a day to form a fluorescent layer of a thickness of about 300$\mu$. The radiation image storage panel thus obtained was named "Panel A".

On the other hand, another radiation image storage panel (Panel B) was manufactured for comparison with Panel A in the same manner as mentioned above except for not adding the blue colorant to the coating dispersion.

Then, Panel A and Panel B were exposed to X-rays of 80 KVp and 250 mA emitted by an X-ray source located at a distance of 180 cm from the panels, and thereafter, the panels were scanned with a He-Ne laser beam (633 nm). The light emitted by the fluorescent layer of the panels was detected and converted to an electrical signal by a photosensor (a photomultiplier having a spectral sensitivity of type S-5). The electrical signal obtained was converted to an image signal by a reproduction device, and a visible image was displayed by a display device. The modulation transfer function (MTF) of the image was obtained for both Panel A and Panel B. The results are shown in Table 1 below. It should be noted that the MTF value of the respective images obtained by Panel A and Panel B and the relationship therebetween do not depend upon what type of the reproduction device and the display device are used.

Figure 2:
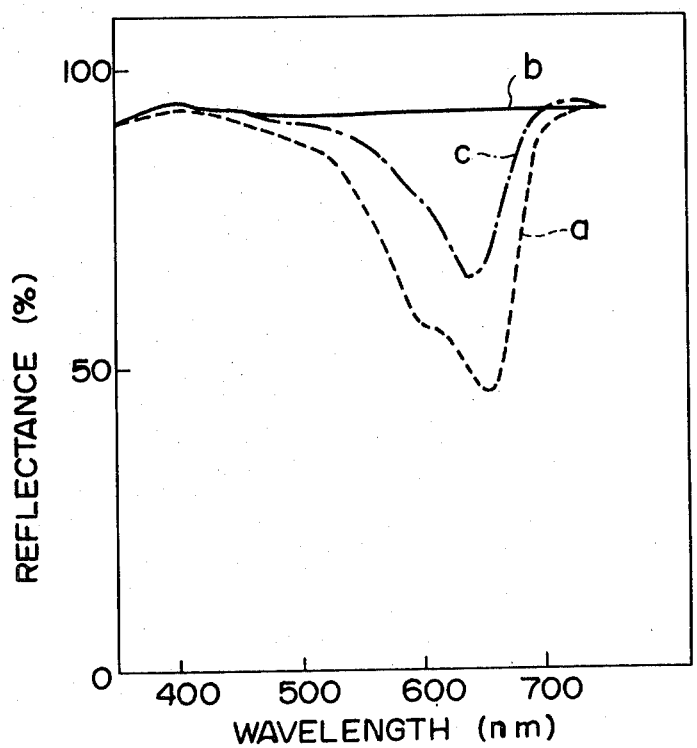
FIG. 2 is a graph showing the reflection spectra of both the radiation image storage panels of the present invention (curves a and c) and the conventional radiation image storage panel (curve b)

The curves a and b shown in FIG. 2 are the reflection spectra of Panel A and Panel B, respectively, measured by an integrating-sphere photometer. As is clear from FIG. 2, Panel A very strongly absorbs a He-Ne laser beam having a wavelength of 633 nm in comparison with Panel B. On the other hand, the absorbance of Panel A in the wavelength region of the light emitted by the BaFBr:Eu$^{2+}$ phosphor upon stimulation thereof is almost the same as that of Panel B (The spectrum of the light emitted by the BaFBr:Eu$^{2+}$ phosphor upon stimulation thereof is shown in FIG. 3.). It is proved from these facts that the sharpness of Panel A is markedly high in comparison with Panel B as shown in Table 1, and that the sensitivity of Panel A is almost the same as that of Panel B.

EXAMPLE 2

100 grams of BaFBr:Eu$^{2+}$ phosphor were added to 100 cc of a dispersion composed of a methanol and 0.001 weight% of Kiton Blue A (organic blue colorant, manufactured by Ciba Geigy AG.) dispersed therein while the dispersion was being stirred, and the stirring was continued for about 10 minutes. After the stirring, the dispersion containing the BaFBr:Eu$^{2+}$ phosphor was allowed to stand until the phosphor particles were precipitated, and then the resulting supernatant liquid was removed. Then, 100 cc of methanol was added to the precipitate to obtain a dispersion. The dispersion was stirred for about 10 minutes and allowed to stand until the phosphor particles were precipitated, and the then resulting supernatant liquid was removed. The above-mentioned cycle was repeated several times until the supernatant liquid lost color. Thereafter, the precipitate was heated at a temperature of about 80° C. to evaporate the methanol contained therein. Thus, the BaFBr:Eu$^{2+}$ phosphor bearing the blue colorant adsorbed on the surface thereof was obtained.

Then, 8 parts by weight of the BaFBr:Eu$^{2+}$ phosphor with the adsorbed blue colorant and one part by weight of nitrocellulose were mixed by use of the same solvent as mentioned in Example 1 to prepare a coating dispersion having a viscosity of 50 centistokes. Thereafter, the coating dispersion was uniformly applied to a polyethylene terephthalate film positioned horizontally and dried naturally by allowing it to stand for a day to form a fluorescent layer of a thickness of about 300$\mu$. The radiation image panel thus obtained was named "Panel C".

Then, the MTF of Panel C was measured in the same manner as mentioned in Example 1. The result is shown in Table 1 below together with the MTF of Panel B. The curve C shown in FIG. 2 is the reflection spectrum of Panel C measured by use of an integrating-sphere photometer.

EXAMPLE 3

A radiation image storage panel was manufactured in the same manner as mentioned in Example 1 except for using Ultramarine Blue No. 1900 (inorganic blue colorant, manufactured by Daiichi Kasei Co., Ltd.) instead of Zapon Fast Blue 3G in the ratio that the amount of the colorant was 25 milligrams per 100 grams of the BaFBr:Eu$^{2+}$ phosphor. The radiation image storage panel thus obtained was named "Panel D".

Then, the MTF of Panel D was measured in the same manner as mentioned in Example 1. The result is shown in Table 1 below together with the MTF of Panel B.

TABLE 1

| Panel | Colorant | Spatial Frequency (cycle/mm) | | | | | | |
|---|---|---|---|---|---|---|---|---|
| | | 0 | 0.5 | 1 | 1.5 | 2 | 2.5 | 3 | 4 |
| A | Zapon Fast Blue 3G | 100 (%) | 89 | 78 | 60 | 46 | 32 | 23 | 10 |
| C | Kiton Blue A | 100 | 88 | 69 | 51 | 34 | 22 | 13 | 6 |
| D | Ultramarine Blue No. 1900 | 100 | 88 | 66 | 44 | 25 | 15 | 10 | 5 |
| B | non | 100 | 75 | 52 | 33 | 18 | 11 | 7 | 3 |

EXAMPLE 4

A radiation image storage panel was manufactured in the same manner as mentioned in Example 1 except for using (Ba$_{0.9}$,Mg$_{0.1}$)FCl:Ce$^{3+}$ phosphor and Cobalt Blue P (inorganic blue colorant, manufactured by Mitsubishi Kinzoku Co., Ltd.) instead of the BaFBr:Eu$^{2+}$ phosphor and Zapon Fast Blue 3G, respectively, in the ratio that the amount of the colorant was 50 milligrams per 100 grams of the (Ba$_{0.9}$,Mg$_{0.1}$)FCl: Ce$^{3+}$ phosphor. The radiation image storage panel thus obtained was named "Panel E".

On the other hand, another radiation image storage panel (Panel F) was manufactured for comparison with this Panel E in the same manner as mentioned above except for not using the blue colorant.

Then, the MTF of both Panel E and Panel F were measured in the same manner as mentioned in Example 1. The results are shown in Table 2 below.

TABLE 2

| Panel | Colorant | Spatial Frequency (cycle/mm) | | | | | | |
|---|---|---|---|---|---|---|---|---|
| | | 0 | 0.5 | 1 | 1.5 | 2 | 2.5 | 3 | 4 |
| E | Cobalt Blue P | 100 (%) | 83 | 61 | 40 | 21 | 10 | 8 | 4 |
| F | non | 100 | 71 | 49 | 30 | 14 | 9 | 5 | 2 |

EXAMPLE 5

A radiation image storage panel was manufactured in the same manner as mentioned in Example 1 except for using LaOBr:$Ce^{3+}$,$Tb^{3+}$ phosphor and Ultramarine Blue No. 3000 (inorganic blue colorant, manufactured by Daiichi Kasei Co., Ltd.) instead of the BaFBr:$Eu^{2+}$ phosphor and Zapon Fast Blue 3G, respectively, in the ratio that the amount of the colorant was 25 milligrams per 100 grams of the LaOBr:$Ce^{3+}$,$Tb^{3+}$ phosphor. The radiation image storage panel thus obtained was named "Panel G".

On the other hand, another radiation image storage panel (Panel H) was manufactured for comparison with this Panel G in the same manner as mentioned above except for not using the blue colorant.

Then, the MTF of both Panel G and Panel H were measured in the same manner as mentioned in Example 1. The results are shown in Table 3 below.

TABLE 3

| Panel | Colorant | Spatial Frequency (cycle/mm) | | | | | | |
|---|---|---|---|---|---|---|---|---|
| | | 0 | 0.5 | 1 | 1.5 | 2 | 2.5 | 3 | 4 |
| G | Ultramarine Blue No. 3000 | 100 (%) | 90 | 68 | 47 | 28 | 17 | 12 | 6 |
| H | non | 100 | 77 | 55 | 35 | 20 | 13 | 8 | 4 |

As is clear from Table 1, Table 2 and Table 3 above, the radiation image storage panel of the present invention colored with a colorant provides a markedly sharp image than the conventional radiation image storage panel.

We claim:

1. A radiation image storage panel having a fluorescent layer comprising a binder and a stimulable phosphor dispersed therein characterized in that said panel is colored with a colorant so that the mean reflectance of said panel in the wavelength region of the stimulating rays for said stimulable phosphor is lower than the mean reflectance of said panel in the wavelength region of the light emitted by said stimulable phosphor upon stimulation thereof.

2. A radiation image storage panel as defined in claim 1 wherein the mean reflectance of said panel in the wavelength region of said stimulating rays is not higher than 95% of the mean reflectance of a panel equivalent to said panel except for being uncolored with said colorant in the wavelength region of said stimulating rays.

3. A radiation image storage panel as defined in claim 1 wherein the mean reflectance in said panel in the wavelength region of said light is now lower than 30% of the mean reflectance of a panel equivalent to said panel except for being uncolored with said colorant in the wavelength region of said light.

4. A radiation image storage panel as defined in claim 3 wherein said mean reflectance in said panel is not lower than 90% of the mean reflectance of said equivalent panel.

5. A radiation image storage panel as defined in claim 1 wherein said panel consists solely of said fluorescent layer, said fluorescent layer being colored with said colorant.

6. A radiation image storage panel as defined in claim 1 wherein said panel comprises a first protective layer, a fluorescent layer disposed thereon, and a second protective layer disposed further thereon, and at least one of said layers is colored with said colorant.

7. A radiation image storage panel as defined in claim 1 wherein said panel comprises a substrate and a fluorescent layer provided thereon, and said substrate and/or said fluorescent layer is colored with said colorant.

8. A radiation image storage panel as defined in claim 1 wherein said panel comprises a substrate, a primer layer disposed thereon and a fluorescent layer disposed further thereon, and at least one of said substrate and said layers is colored with said colorant.

9. A radiation image storage panel as defined in claim 1 wherein said panel comprises a substrate, a fluorescent layer disposed thereon and a protective layer disposed further thereon, and at least one of said substrate and said layers is colored with said colorant.

10. A radiation image storage panel as defined in claim 1 wherein said panel comprises a substrate, a primer layer disposed thereon, a fluorescent layer disposed further thereon, and a protective layer disposed further thereon, and at least one of said substrate and said layers is colored with said colorant.

11. A radiation image storage panel as defined in claim 1 wherein said panel comprises a substrate, a first fluorescent layer disposed thereon, an intermediate layer disposed further thereon, and a second fluorescent layer disposed further thereon, and at least said intermediate layer is colored with said colorant.

12. A radiation image storage panel as defined in claim 1 wherein said panel comprises a substrate, a first fluorescent layer disposed thereon, an intermediate layer disposed further thereon, a second fluorescent layer disposed further thereon, and a protective layer disposed further thereon, and at least said intermediate layer is colored with said colorant.

13. A radiation image storage panel as defined in claim 1 wherein said panel comprises a substrate, a primer layer disposed thereon, a first fluorescent layer disposed further thereon, an intermediate layer disposed further thereon, a second fluorescent layer disposed further thereon, and a protective layer disposed further thereon, and at least said intermediate layer is colored with said colorant.

* * * * *